(12) United States Patent
Hildenbrand et al.

(10) Patent No.: US 11,436,141 B2
(45) Date of Patent: Sep. 6, 2022

(54) FREE MEMORY PAGE HINTING BY VIRTUAL MACHINES

(71) Applicant: Red Hat, Inc., Raleigh, NC (US)

(72) Inventors: David Hildenbrand, Grasbrunn (DE); Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 345 days.

(21) Appl. No.: 16/713,934

(22) Filed: Dec. 13, 2019

(65) Prior Publication Data

US 2021/0182191 A1    Jun. 17, 2021

(51) Int. Cl.
*G06F 12/06* (2006.01)
*G06F 9/455* (2018.01)

(52) U.S. Cl.
CPC ...... *G06F 12/0646* (2013.01); *G06F 9/45558* (2013.01); *G06F 2009/45583* (2013.01); *G06F 2212/1044* (2013.01); *G06F 2212/152* (2013.01)

(58) Field of Classification Search
CPC ....... G06F 9/45558; G06F 2009/45583; G06F 12/0646; G06F 2212/1044; G06F 2212/152
USPC ......................................................... 711/170
See application file for complete search history.

(56) References Cited

U.S. PATENT DOCUMENTS

| | | | |
|---|---|---|---|
| 6,598,143 B1 | 7/2003 | Baker et al. | |
| 7,337,296 B2 | 2/2008 | Noel et al. | |
| 7,433,951 B1 | 10/2008 | Waldspurger | |
| 7,516,292 B2 | 4/2009 | Kimura | |
| 8,086,811 B2 | 12/2011 | Gainey | |
| 8,255,658 B2 | 8/2012 | Adachi | |
| 8,583,875 B1 | 11/2013 | Garthwaite | |
| 8,667,496 B2 | 3/2014 | Levin | |
| 8,689,007 B2 | 4/2014 | Schunter et al. | |
| 8,789,034 B1 | 7/2014 | Emelyanov et al. | |
| 8,856,194 B2 | 10/2014 | Chen et al. | |
| 8,875,295 B2 | 10/2014 | Lutas et al. | |
| 8,943,259 B2 | 1/2015 | Weissman et al. | |
| 9,069,782 B2 | 6/2015 | Yang et al. | |
| 9,147,078 B2 | 9/2015 | Muff et al. | |
| 9,183,157 B2 | 11/2015 | Qiu et al. | |
| 9,201,682 B2 | 12/2015 | Cheng et al. | |
| 9,251,090 B1 | 2/2016 | Borthakur et al. | |
| 9,268,678 B2 | 2/2016 | Tuch et al. | |

(Continued)

OTHER PUBLICATIONS

Denneman, Frank, "Impact of Memory Reservation", Dec. 8, 2009, http://frankdenneman.nl/2009/12/08/impact-of-memory-reservation, 18 pages.

(Continued)

*Primary Examiner* — Reginald G Bragdon
*Assistant Examiner* — Aaron D Ho
(74) *Attorney, Agent, or Firm* — Lowenstein Sandler LLP (57) ABSTRACT

Systems and methods for free memory hinting by virtual machines. An example method comprises: identifying, by a virtual machine running on a host computer system, a first memory page referenced by a free memory list maintained by the virtual machine; identifying a second memory page residing in a hinting buffer associated with the virtual machine; moving the second memory page to the free memory list; disassociating the first memory page from the free memory list; and notifying the host computer system of an identifier of the first memory page.

18 Claims, 6 Drawing Sheets

(56) References Cited

U.S. PATENT DOCUMENTS

| | | | |
|---|---|---|---|
| 9,280,458 B2 | 3/2016 | Durrant | |
| 9,280,486 B2 | 3/2016 | van Riel | |
| 9,298,377 B2 | 3/2016 | Baskakov et al. | |
| 9,355,023 B2 | 5/2016 | Badam et al. | |
| 9,361,218 B2 | 6/2016 | Ahmad et al. | |
| 9,390,028 B2 | 7/2016 | Gordon et al. | |
| 9,442,754 B1 | 9/2016 | Tsirkin | |
| 9,448,928 B2 | 9/2016 | Ahad et al. | |
| 9,459,900 B2 | 10/2016 | Tsirkin | |
| 9,471,346 B2 | 10/2016 | Gaonkar et al. | |
| 9,507,540 B1 | 11/2016 | Adogla et al. | |
| 9,509,501 B2 | 11/2016 | Bursell | |
| 9,524,233 B2 | 12/2016 | Venkatasubramanian et al. | |
| 9,529,611 B2 | 12/2016 | McDougall et al. | |
| 9,552,233 B1 | 1/2017 | Tsirkin et al. | |
| 9,619,263 B2 | 4/2017 | Broas | |
| 9,672,062 B1 | 6/2017 | Tsirkin et al. | |
| 9,798,482 B1 | 10/2017 | Tsirkin et al. | |
| 9,910,774 B1* | 3/2018 | Gupta | G06F 9/45558 |
| 9,940,228 B2 | 4/2018 | Corrie | |
| 10,083,058 B2 | 9/2018 | Tsirkin et al. | |
| 10,496,547 B1* | 12/2019 | Naenko | G06F 3/0659 |
| 10,579,439 B2 | 3/2020 | van Riel et al. | |
| 2007/0016904 A1 | 1/2007 | Adlung et al. | |
| 2008/0307188 A1 | 12/2008 | Franaszek et al. | |
| 2009/0307447 A1 | 12/2009 | Jacobs et al. | |
| 2010/0070678 A1 | 3/2010 | Zhang et al. | |
| 2010/0095074 A1 | 4/2010 | Ganesh et al. | |
| 2010/0169536 A1 | 7/2010 | Shedel et al. | |
| 2010/0325268 A1 | 12/2010 | Muthiah et al. | |
| 2011/0154133 A1 | 6/2011 | Ganti et al. | |
| 2011/0246767 A1 | 10/2011 | Chaturvedi et al. | |
| 2011/0320682 A1 | 12/2011 | Mcdougall et al. | |
| 2012/0079479 A1 | 3/2012 | Hakewill | |
| 2012/0239850 A1 | 9/2012 | Qiu et al. | |
| 2012/0317331 A1 | 12/2012 | Broas | |
| 2012/0331242 A1 | 12/2012 | Shaikh et al. | |
| 2013/0031293 A1* | 1/2013 | Van Riel | G06F 12/10 711/6 |
| 2013/0145073 A1 | 6/2013 | Tuch et al. | |
| 2013/0290595 A1* | 10/2013 | Weissman | G06F 16/217 711/6 |
| 2013/0290596 A1 | 10/2013 | Corrie | |
| 2013/0339568 A1 | 12/2013 | Corrie | |
| 2014/0108764 A1* | 4/2014 | Li | G06F 12/123 711/171 |
| 2014/0173227 A1 | 6/2014 | Min et al. | |
| 2015/0039838 A1 | 2/2015 | Farasuk-Levin et al. | |
| 2015/0089010 A1 | 3/2015 | Tsirkin et al. | |
| 2015/0161056 A1* | 6/2015 | Deguillard | G06F 9/5016 711/6 |
| 2015/0199209 A1 | 7/2015 | Tsirkin | |
| 2015/0242159 A1 | 8/2015 | Tsirkin | |
| 2015/0301946 A1 | 10/2015 | Guo et al. | |
| 2016/0077965 A1 | 3/2016 | Gaonkar et al. | |
| 2016/0078585 A1 | 3/2016 | Sheldon et al. | |
| 2016/0085695 A1 | 3/2016 | Leslie-Hurd et al. | |
| 2016/0253201 A1 | 9/2016 | Zhang et al. | |
| 2016/0350236 A1 | 12/2016 | Tsirkin et al. | |
| 2016/0350244 A1 | 12/2016 | Tsirkin et al. | |
| 2017/0108914 A1 | 4/2017 | Chun et al. | |
| 2017/0206175 A1 | 7/2017 | Sliwa et al. | |
| 2018/0095899 A1 | 4/2018 | Durham et al. | |
| 2018/0285140 A1 | 10/2018 | Kaplan et al. | |
| 2019/0065267 A1 | 2/2019 | van Riel et al. | |
| 2019/0065276 A1 | 2/2019 | van Riel et al. | |
| 2020/0201685 A1 | 6/2020 | van Riel et al. | |
| 2020/0409740 A1* | 12/2020 | Li | G06F 21/44 |

OTHER PUBLICATIONS

Bug 995420—Qemu-Kvm Process do not Release Memory(RES) after Guest Do Stress Test, 2013, https://bugzilla.redhat.com/show_bug.cgi?id=995420/.

VanRiel, Rik, "Guest Memory Overcommit—Page Hinting, Resizing & More", Red Hat, 2011, http://www.linux-kvm.org/images/f/ff/2011-forum-memory-overcommit pdf, 14 pages.

8.2. Memory Tuning on Virtual Machines, https://access.redhat.com/documentation/en-US/Red_Hat_Enterprise_Linux/7/html/Virtualization_Tuning_and_Optimization_Guide/sect-Virtualization_Tuning_Optimization_Guide-Memory-Tuning.html, 6 pages, 2017, retrieved Jun. 27, 2017.

Agarwal, N. et al., "Thermostat: Application-transparent Page Management for Two-tiered Main Memory", Apr. 12, 2017, University of Michigan, http://web.eecs.umich.edu/~twenisch/papers/asplos17.pdf, 14 pages.

Huang, Jian, Qureshi, Moinuddin K., Schwan, Karsten, "An Evolutionary Study of Linux Memory Management for Fun and Profit", Jun. 24, 2016, Georgia Institute of Technology, https://www.usenix.org/system/files/conference/atc16/atc16_paper-huang.pdf, 15 pages.

VanRiel, Rik, "Re: [patch: 0/6] Guest page hinting". Posted Mar. 27, 2009. <https://lkml.org/lkml/2009/3/27/503>, 2 pages.

Corbet. "Guest page hinting". Posted Sep. 6, 2006. <http://lwn.net/Articles/198380/>. Comment posted by rvdheij on Sep. 14, 2006, 2 pages.

Waldspurger, C.A., "Memory Resource Management in VMware ESX Server," Proceedings of the 5th Symposium on Operating Systems Design and Implementation, Boston, Massachusetts, Dec. 9-11, 2002, 15 pages.

Scwidefsky, M. et al., "Collaborative Memory Management in Hosted Linux Environments," (IBM), Linux Symposium, Ottawa, Canada, Jul. 19-22, 2006, 16 pages.

Van Riel, R., "KVM Performance Optimizations Internals," The Red Hat Summit, Boston, Massachusetts, May 5, 2011, 25 pages.

Corbet, J., "Linux Filesystem, Storage, and Memory Management Summit, Day 2," 2011 Linux Filesystem, Storage and Memory Management Summit, San Francisco, California, Apr. 5, 2011, 9 pages.

The Role of Memory in VMware ESX Server 3—Information Guide, VMware, Inc. Sep. 26, 2006, 11 pages.

Schwidefsky, M., "Linux Kernel Archive: [patch 0/6] [rfc] guest page hinting version 5" (May 11, 2007), downloaded on Jul. 28, 2011 from http://llkml.indiana.edu/hypermail/linux/kernel/0705.1/21 01 html, 2 pages.

Schwidefsky, M., "Linux Kernel Archive: [patch 1/6] Guest page hinting: core+ volatile page cache," (Jun. 28, 2007), downloaded on Jul. 28, 2011 from http://comments.gmane.org/gmane.comp.emulators.kvm .devel/4314, 1 page.

Schwidefsky, M., "Linux Kernel Archive: [patch 2/6] Guest page hinting," (May 11, 2007), downloaded on Jul. 28, 2011 from http://llkml.indiana.edu/hypermail/linux/kernel/0705.1/2100html, 8 pages.

Schwidefsky, M., "Linux Kernel Archive: [patch 3/6] Guest page hinting: mlocked pages," (May 11, 2007), downloaded on Jul. 28, 2011 from http://llkml.indiana.edu/hypermail/linux/kernel/0705.1/21 02html, 3 pages.

Schwidefsky, M., "Linux Kernel Archive: [patch 4/6] Guest page hinting: writable page table entries," (May 11, 2007), downloaded on Jul. 28, 2011 from http://llkml.indiana.edu/hypermail/linux/kernel/0705.1/21 04html, 7 pages.

Schwidefsky, M., "Linux Kernel Archive: [patch 5/6] Guest page hinting: minor fault optimization," (May 11, 2007), downloaded on Jul. 28, 2011 from http://llkml.indiana.edu/hypermail/linux/kernel/0705.1/21 03html, 5 pages.

Schwidefsky, M., "Linux Kernel Archive: [patch 6/6] Guest page hinting: s390 support," (May 11, 2007), downloaded on Jul. 28, 2011 from http://lkml.indiana.edu/hypermail/linux/kernel/0705.1 /21 05html, 14 pages.

Schwidefsky, M., "Guest page hinting: cover page." Published Sep. 6, 2006. <http://lwn.net/Articles/198384/>.

Kernel Zeroes Memory? Stack Overflow, 3 pages, downloaded from http://stackoverflow.com/questions/6004816/kernel-zeroes-memory on Sep. 1, 2016.

Hosterman, C. "Pure Storage FlashArray and Re-Examining VMware Virtual Disk Types," Cody Hosterman, FlashArray, VAAI, VMware, XCopy, Jul. 23, 2014, 9 pages, downloaded from http://www.

(56) References Cited

OTHER PUBLICATIONS codyhosterman.com/2014/07/pure-storage-flasharray-and-re-examining-vmware-virtual-disk-types/ on Sep. 1, 2016.
Chiang et al. "Working Set-based Physical Memory Ballooning," 10th International Conference on Autonomic Computing (ICAC '13), USENIX Association, pp. 95-99, 2013.
Performance Best Practices for VMware vSphere® 5.5 VMware, Inc., Sep. 19, 2013, 90 pages.
Chen, W. et al. "Improving host swapping using adaptive prefetching and paging notifier" Proceedings of the 19th ACM International Symposium on High Performance Distributed Computing; Jun. 21-25, 2010; pp. 300-303.
Bigelow, S. "How Hypervisors Dynamically Allocate Memory to Improve VM Performance", Search Server Virtualization, Jun. 2013, 10 pages.
Yang, J. et al., "Using Hypervisor to Provide Data Secrecy for User Applications on a Per-Page Basis", University of Michigan, Mar. 5, 2008, 10 pages.
Hetzelt, F. et al., "Security Analysis of Encrypted Virtual Machines", Cornell University Library, Dec. 4, 2016, 3 pages.
Eklektix, Inc., "Guest Page Hinting", https://lwn.net/Articles/198380/, Sep. 6, 2006, 2 pages.
VMware, Inc., "Understanding Memory Resource Management in VMware® ESX™ Server", https://www.vmware.com/content/dam/digitalmarketing/vmware/en/pdf/techpaper/perf-vsphere-memory_management.pdf, 2009, 20 pages.

\* cited by examiner

FIG 6

FREE MEMORY PAGE HINTING BY VIRTUAL MACHINES

TECHNICAL FIELD

The present disclosure is generally related to virtualized computer systems, and more particularly, to memory allocation in virtualized computer systems.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for free memory page hinting by virtual machines.

A host computer system may support a virtual memory environment in which a virtual machine address space is simulated with a smaller amount of the host random access memory (RAM) and a persistent storage device, thus allowing the host to over-commit the memory. Memory over-commitment may be further facilitated by free memory page hinting by the guest operating system (OS) of the virtual machine, which involves the guest OS notifying the hypervisor of one or more guest memory pages that are not currently in use by the guest, thus allowing the host to reuse the hinted memory pages without copying their contents to the persistent storage.

"Memory page" herein shall refer to a contiguous portion of memory of a certain size. For example, a standard memory page may have the size of 4 KB, while a huge page may have the size of 2 MB or 1 GB. Memory management systems and methods implemented in accordance with one or more aspects of the present disclosure may, without limitation, operate with memory pages of the above-referenced and/or other sizes.

In an illustrative example, free page hinting may be facilitated by a balloon driver running under the guest OS. The balloon pseudo-device may inflate by allocating a specified number of guest memory pages, thus making those pages unusable by the guest OS and signaling to the hypervisor that the memory pages are available to use by the host. In another illustrative example, free page hinting may be facilitated by a data structure (such as a bitmap) representing the guest memory pages, the entries of which (e.g., individual bits) may be set or cleared by the guest to signal the memory page availability to the host.

Various implementations of free page hinting may suffer from occurrences of false out of memory situations, which may arise due to the fact that a memory page cannot be used by the guest during the time period between the guest sending the memory page address to the host and the host receiving the hint and de-allocating the page from the guest, since doing otherwise might cause the guest to crash due to the host overwriting the memory page. Thus, during this time window, which in various implementations may vary from several microseconds to several milliseconds, a part of the guest memory may be unavailable to guest applications, and an attempt to allocate a memory chunk for a guest application may fail, thus triggering a false out-of-memory situation.

Furthermore, since each hint involves a certain overhead caused by guest-to-host communications, and the overhead does not depend on the size of the memory chunk being referenced by the hint, the efficiency of free page hinting increases with increasing the size of the memory chunks being hinted. However, making larger portions of memory unavailable for the guest for the duration of the hinting time window increases the chances of occurrences of false out-of-memory situations.

Implementations of the present disclosure address the above-noted and other deficiencies by providing systems and methods for free memory page hinting by balloon pseudo-devices utilizing a hinting buffer in order to avoid reducing the amount of available guest memory, which may otherwise be caused by the hinting process. The hinting buffer may be allocated by the balloon driver, e.g., during the balloon pseudo-device initialization sequence. In operation, before hinting to the host a memory page referenced by the guest free memory list, the balloon driver would take a memory page out of the hinting buffer and move it to the guest free memory list. Moving a memory page from the hinting buffer to the guest free memory list and hinting a free memory page may be performed atomically, thus compensating for unavailability of the hinted memory page to the guest for the duration of the hinting process (since the number of memory pages in the free memory list would remain unaffected by the two operations), and therefore preventing a false out-of-memory situation from being triggered.

Once the host processes the hint and signals the completion to the guest, the balloon driver may append the hinted page to the hinting buffer. Alternatively, the balloon driver may, upon receiving the host notification, move the substitute memory page back to the hinting buffer, provided that the substitute memory page has not been used by the guest. Therefore, the number of memory pages that may be hinted to the host without waiting for the host to process the previous hints is defined by the size of the hinting buffer.

Thus, the systems and methods described herein improve the efficiency of virtual memory management by virtualized computer systems by preventing false out-of-memory situations from occurring while the free memory hinting is being performed by the guest OS. Various aspects of the above-referenced methods and systems are described in details herein below by way of examples, rather than by way of limitation. The examples provided below discuss a virtualized computer system with a hypervisor and host operating system, but other examples may include a hypervisor without an underlying host operating system (e.g., bare metal hypervisor).

Figure 1:
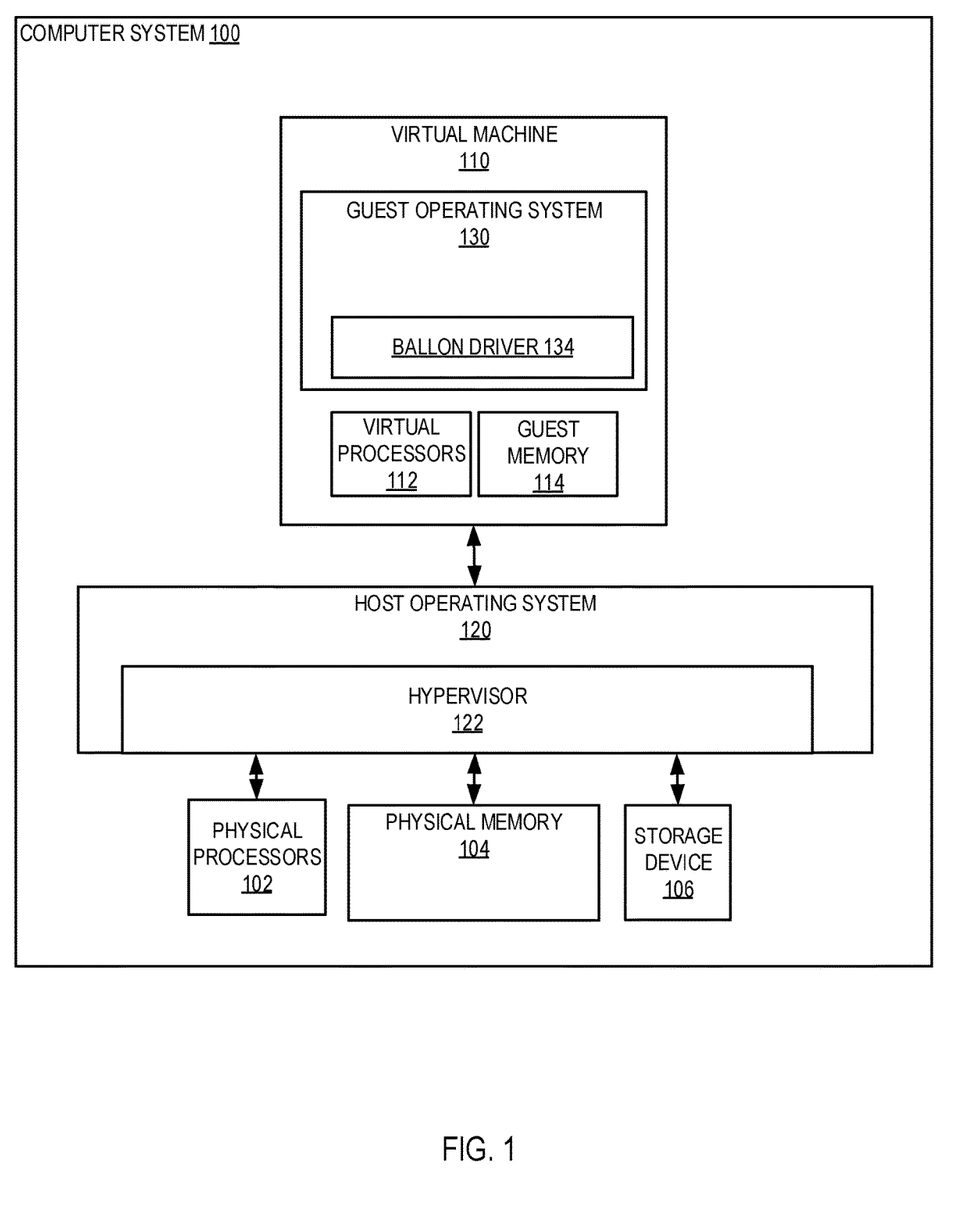
FIG. 1 depicts an illustrative architecture of a computer system 100, in accordance with one or more aspects of the present disclosure.

FIG. 1 depicts an illustrative architecture of a computer system 100, in accordance with one or more aspects of the present disclosure. It should be noted that other architectures for computer system 100 are possible, and that the implementation of a computer system utilizing embodiments of the disclosure are not necessarily limited to the specific architecture depicted. In the example shown in FIG. 1, computer system 100 may include one or more virtual machines 110 and a host operating system 120.

Computer system 100 may be a single host machine or multiple host machines arranged in a cluster and may include a rackmount server, a workstation, a desktop computer, a notebook computer, a tablet computer, a mobile phone, a personal digital assistant (PDA), etc. Computer system 100 may include host hardware, which may include one or more physical processors 102, physical memory 104, storage device 106, and hardware components (e.g., I/O devices), or a combination thereof.

Physical processors 102 herein refer to devices capable of executing instructions encoding arithmetic, logical, or I/O operations. In one example, a processor may follow von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). It should be noted that although, for simplicity, multiple physical processors 102 are depicted in FIG. 1, in some other embodiments computer system 100 may comprise a single central processing unit.

Physical memory 104 and storage device 106 may include any data storage that is capable of storing digital data. Physical memory 104 may include volatile memory devices (e.g., random access memory (RAM)), non-volatile memory devices (e.g., flash memory, NVRAM), and/or other types of memory devices. Storage device 106 may include mass storage devices, such as magnetic or optical storage based disks, tapes, or hard drives. Storage device 106 may be internal to computer system 100 (as shown) or may be external to computer system 100, such as data storage that is accessed by computer system 100 via a direct connection or a network connection.

Computer system 100 may include a hypervisor 122, which may also be known as a virtual machine monitor (VMM). In the example shown, hypervisor 122 may be a component of a host operating system 120. In another example, hypervisor 122 may run on top of a host operating system 120, or may run directly on host hardware without the use of a host operating system 120. Hypervisor 122 may manage system resources, including access to physical processors 102, physical memory 104, storage device 106, and I/O devices. The hypervisor 122, though typically implemented in software, may emulate and export a bare machine interface to higher level software in the form of virtual processors 112 and guest memory 114. Higher level software may comprise a standard or real-time operating system (OS), may be a highly stripped down operating environment with limited operating system functionality, may not include traditional OS facilities, etc. Hypervisor 122 may present other software (i.e., "guest" software) the abstraction of one or more virtual machines (VMs) 110 that provide the same or different abstractions to various guest software (e.g., guest operating system, guest applications).

Computer system 100 may host any number of virtual machines 110 (e.g., a single VM, one hundred VMs, etc.). Virtual machine 110 may execute guest software that uses an underlying emulation of the physical resources (e.g., virtual processors 112 and guest memory 114). The guest software may include a guest operating system 130, one or more guest applications (not shown in FIG. 1), one or more guest device drivers, etc. Virtual machine 110 can be, for example, hardware emulation, full virtualization, para-virtualization, and operating system-level virtualization virtual machines. The virtual machine 110 may have the same or different types of guest operating systems 130, such as Windows®, Linux®, etc.

As noted herein above, guest operating system 130 may include a balloon driver 134, which may implement certain memory management features in cooperation with hypervisor 122. In an illustrative example, the balloon pseudo-device may inflate by allocating a specified number of guest memory pages, thus making those pages unusable by the guest OS and signaling to the hypervisor that the memory pages are available to use by the host. In certain implementations, balloon driver 134 may implement the methods of free memory page hinting described herein. Various features of balloon driver 134 are discussed in more detail below with reference to FIG. 2.

More or less components of host computer system 100 may be included without loss of generality. For example, two or more hardware devices may be combined into a single hardware device, or one of the hardware devices may be divided into two or more hardware device. In another examples, two or more software components may be combined into a single software components, or one of the software components may be divided into two or more software components. In various implementations, one or more of the software components may reside on different computing devices (e.g., different server computers, on a single client device, distributed among multiple client devices, etc.).

Figure 2:
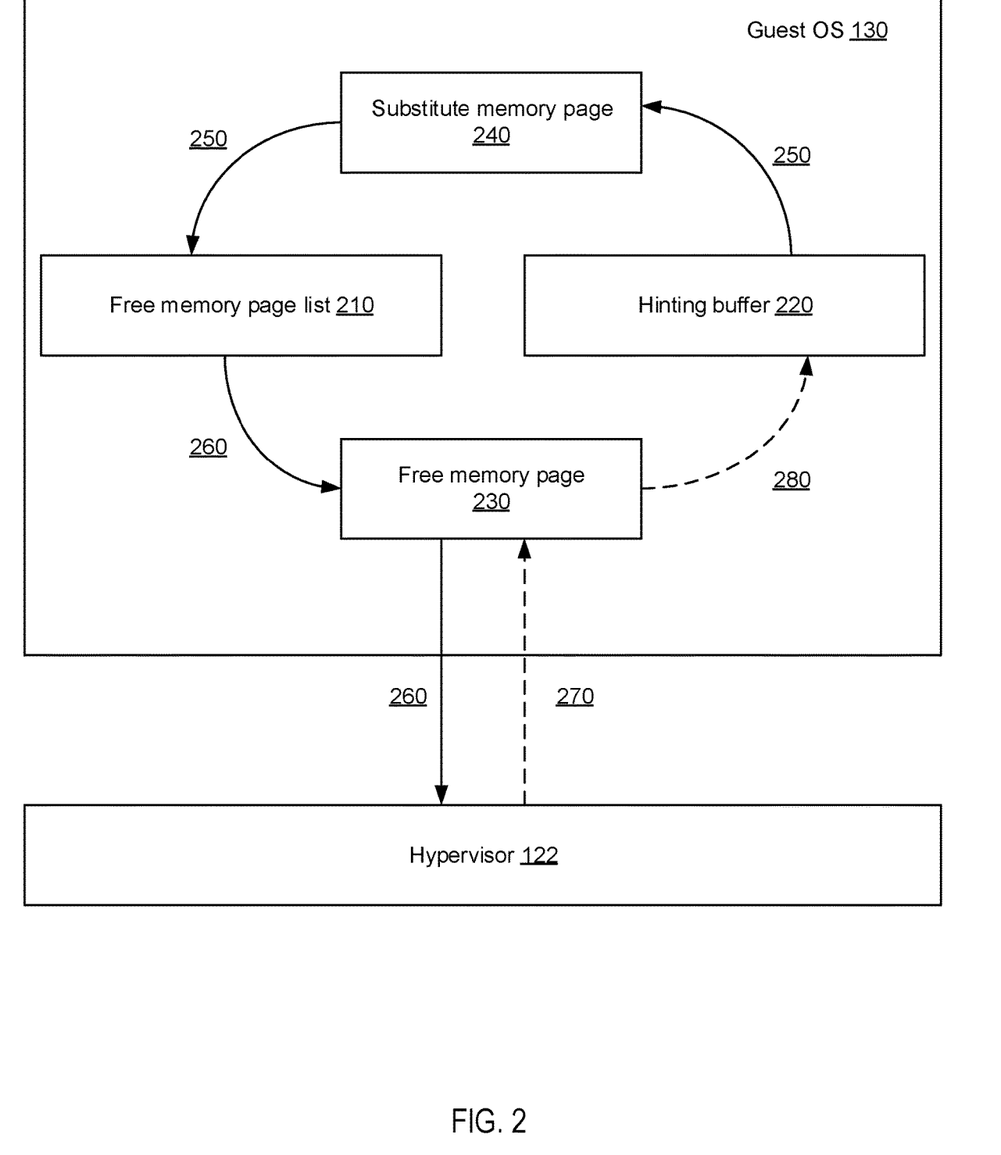
FIG. 2 schematically illustrates operation of a virtual machine performing free memory page hinting in accordance with one or more aspects of the present disclosure.

FIG. 2 schematically illustrates operation of guest OS 130 performing free memory page hinting in accordance with one or more aspects of the present disclosure. In the illustrative example of FIG. 2, guest OS 130 may maintain a free memory list 210, which may include identifiers (e.g., guest virtual addresses) of memory pages that are available for allocation to the guest applications. In order to implement cooperative memory management with hypervisor 122 of FIG. 1, guest OS 130 may notify ("hint") the host of one or more guest memory pages that are not currently in use by the guest, thus allowing the host to reuse the physical memory allocated to the hinted memory pages without copying their contents to the persistent storage. In an illustrative example, guest OS may hint one or more guest memory pages to the host responsive to evaluating one or more memory pressure metrics (e.g., determining that the amount of available memory exceeds a certain threshold). In another illustrative example, guest OS may hint one or more guest memory pages to the host responsive to receiving the host request to relinquish a certain amount of memory.

As noted herein above, cooperative memory management may be implemented by the guest OS running a balloon driver (e.g., balloon driver 134 of FIG. 1), which may inflate by allocating a specified number of guest memory pages, thus making those pages unusable by the guest OS and signaling to the hypervisor that the memory pages are available to use by the host.

The balloon driver may utilize a hinting buffer 220 in order to avoid reducing the amount of available guest memory (e.g., the number of memory pages referenced by free memory list 210), which may otherwise be caused by the hinting process. In an illustrative example, hinting buffer 220 may be allocated by balloon driver 134 as part of performing the initialization sequence of the balloon pseudo-device. The size of the hinting buffer may be provided by an initialization parameter of balloon driver 134.

In operation, before hinting to the host a free memory page 230 referenced by free memory list 210, balloon driver 134 may identify, in hinting buffer 220, a substitute memory page 240 and move the identified substitute memory page 240 to free memory list 210 (operation 250). Balloon driver 134 may then remove the reference to free memory page 230 from free memory list 210 and perform the hinting, e.g., by adding free memory page 230 to the balloon (not shown in FIG. 2) and notifying hypervisor 122 of the address of free memory page 230 (operation 260).

Moving a memory page from hinting buffer 220 to free memory list 210 (operation 250) and hinting the free memory page (operation 260) may be performed atomically, thus compensating for unavailability of the hinted memory page 230 to guest OS 130 for the duration of the hinting process (since the number of memory pages in free memory list 210 would remain unaffected by the two operations 250 and 260), and therefore preventing a false out-of-memory situation from being triggered.

Once the host processes the hint, hypervisor 122 may signal the completion to guest OS 130 (operation 270). Upon receiving notification 270, the balloon driver may append the hinted page to the hinting buffer (operation 280). Alternatively, the balloon driver may, upon receiving notification 270 from the host, move substitute memory page 240 back to hinting buffer 220, provided that the page has not been used by the guest.

Therefore, the number of memory pages that may be hinted to the host without waiting for the host to process the previous hints is defined by the size of the hinting buffer, which, as noted herein above, may be specified by a balloon driver parameter and may be allocated during the balloon pseudo-device initialization.

In implementations of the systems and methods described herein, various guest-to-host communication mechanisms may be used for notifying the host of the hinted memory page identifier and notifying the guest of completion of the memory re-allocation by the host. In an illustrative example, the guest and the host may utilize one or more shared memory data structures for notifying the host of the hinted memory page identifier and notifying the guest of completion of the memory re-allocation by the host.

In another illustrative example, the guest may utilize a hypercall for notifying the host of the hinted memory page identifier. "Hypercall" herein shall refer to a function call by the guest to the hypervisor in order to request a privileged operation, e.g., updating a page table. The hypercall return may be implemented by a callback function, which would be invoked by the hypervisor to signal the completion of the requested operation.

Figure 3:
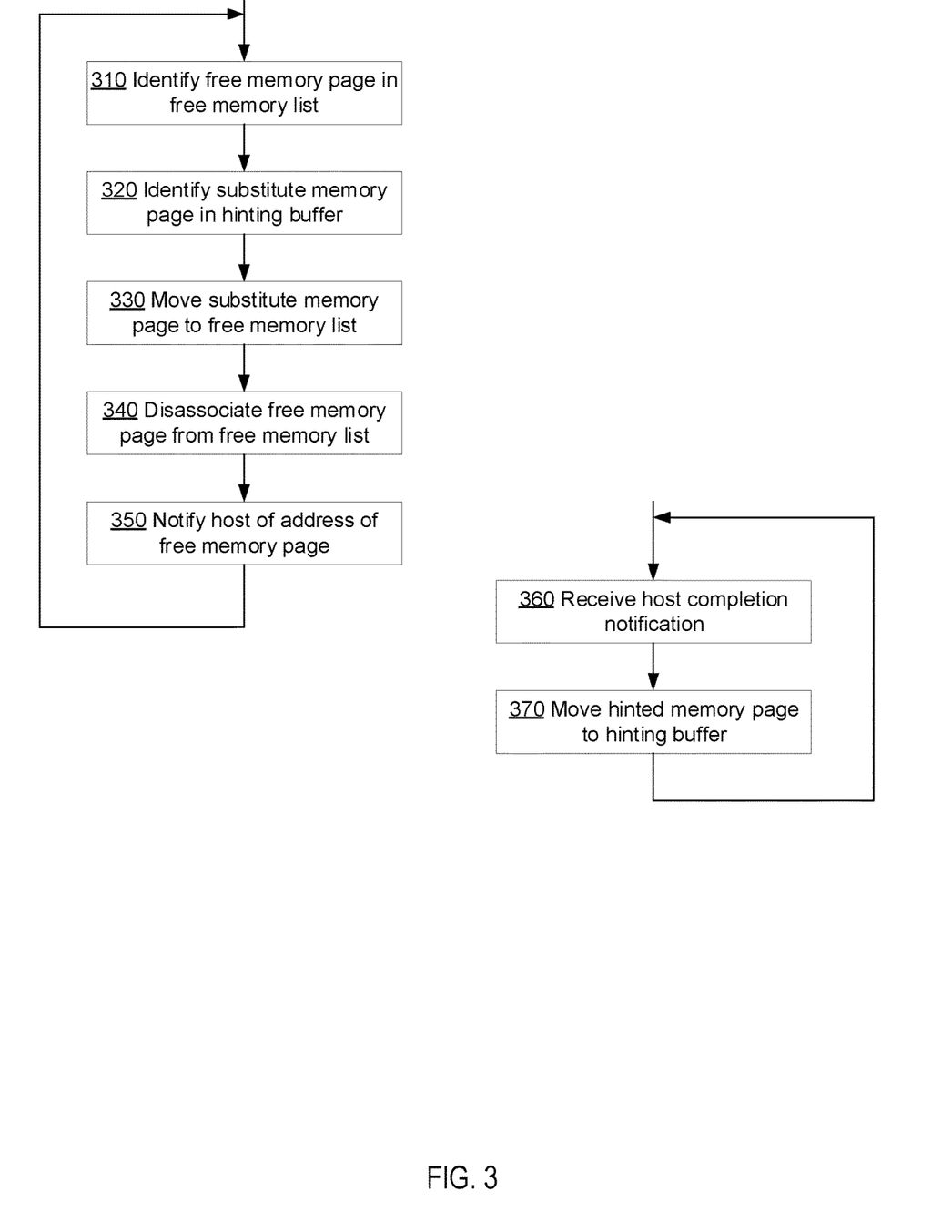
FIG. 3 depicts a flow diagram of an example method for free memory page hinting by a virtual machine, in accordance with one or more aspects of the present disclosure.

FIG. 3 depicts a flow diagram of an example method for free memory page hinting by a virtual machine, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, methods 300 may be performed by two or more processing threads, each thread executing one or more individual functions, routines, subroutines, or operations of the method. In an illustrative example, the processing threads implementing methods 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by guest OS 130 of FIG. 1 and/or balloon driver 134 of FIG. 1.

At block 310, a processing device executing the guest OS may identify a free memory page referenced by a free memory list maintained by the virtual machine. The free memory list may include identifiers (e.g., guest virtual addresses) of memory pages that are available for allocation to the guest applications, as described in more detail herein above.

At block 320, the processing device may identify a substitute memory page residing in a hinting buffer associated with the virtual machine. The hinting buffer may be allocated by the balloon driver as part of performing the initialization sequence of the balloon pseudo-device. The size of the hinting buffer may be provided by an initialization parameter of the balloon driver, as described in more detail herein above.

At block 330, the processing device may move the substitute memory page to the free memory list, in anticipation of a hinting operation with respect to the identified free memory page, as described in more detail herein above.

At block 340, the processing device may disassociate the free memory page from the free memory list.

At block 350, the processing device may notify the hypervisor of the address of the free memory page. Moving the substitute memory page from the hinting buffer to the free memory list, disassociating the free memory page from the free memory list, and notifying the hypervisor of the address of the free memory page may be performed by an atomic operation, as described in more detail herein above.

Responsive to receiving the free memory page hint, the host computer system may reuse the physical memory page that is allocated to the hinted guest memory page, without first copying the contents of the hinted guest memory page to a persistent storage.

Responsive to receiving, at block 360, a notification of completion of the memory de-allocation operation by the host, the processing device may, at block 370, move the hinted memory page back to the hinting buffer. The completion notification may be received asynchronously with respect to performing other operations of the method 300 (e.g., via a callback function which is invoked by the hypervisor), as described in more detail herein above.

Figure 4:
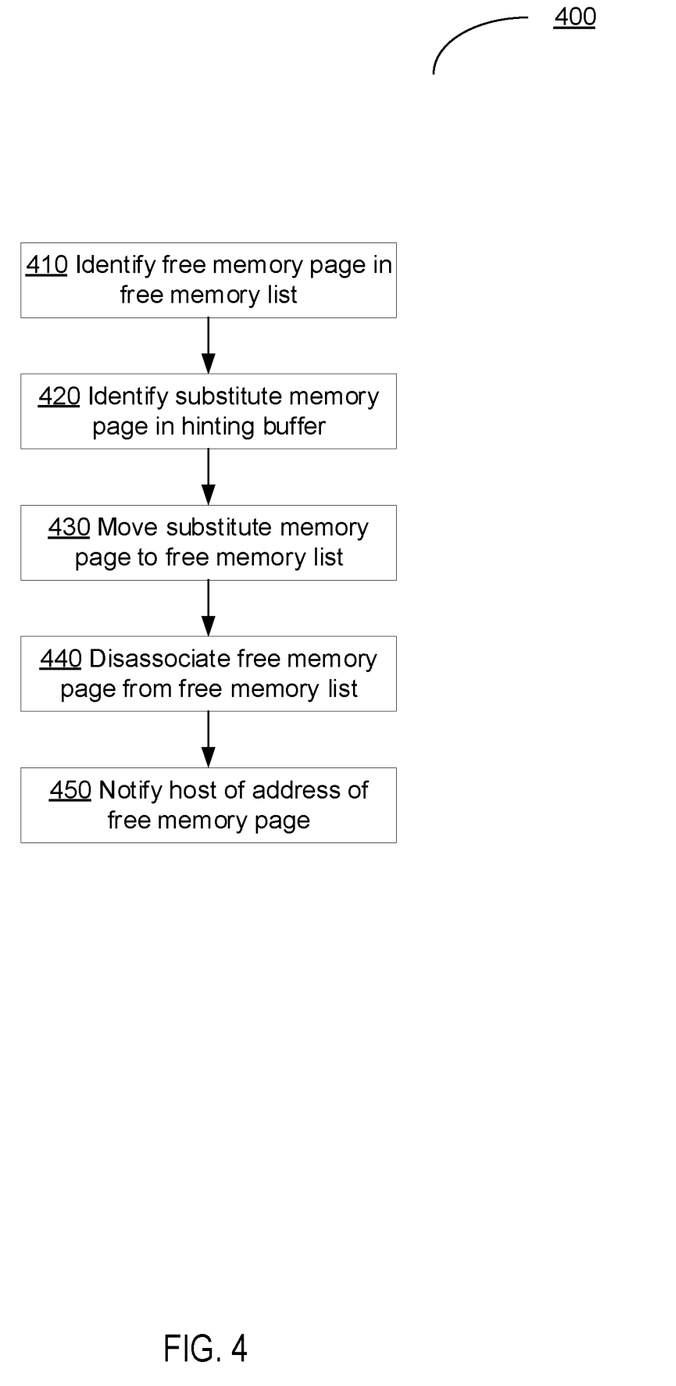
FIG. 4 depicts a flow diagram of another example method for free memory page hinting by a virtual machine, in accordance with one or more aspects of the present disclosure.

FIG. 4 depicts a flow diagram of another example method for free memory page hinting by a virtual machine, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, methods 400 may be performed by two or more processing threads, each thread executing one or more individual functions, routines, subroutines, or operations of the method. In an illustrative example, the processing threads implementing methods 400 may be synchronized (e.g., using semaphores, critical sections, and/or other thread synchronization mechanisms). Alternatively, the processes implementing method 400 may be executed asynchronously with respect to each other. In one implementation, method 400 may be performed by guest OS 140 of FIG. 1 and/or balloon driver 144 of FIG. 1.

At block 410, a processing device executing the guest OS may identify a free memory page referenced by a free memory list maintained by the virtual machine. The free memory list may include identifiers (e.g., guest virtual addresses) of memory pages that are available for allocation to the guest applications, as described in more detail herein above.

At block 420, the processing device may identify a substitute memory page residing in a hinting buffer associated with the virtual machine. The hinting buffer may be allocated by the balloon driver as part of performing the initialization sequence of the balloon pseudo-device. The size of the hinting buffer may be provided by an initialization parameter of the balloon driver, as described in more detail herein above.

At block 430, the processing device may move the substitute memory page to the free memory list, in anticipation of a hinting operation with respect to the identified free memory page, as described in more detail herein above.

At block 440, the processing device may disassociate the free memory page from the free memory list.

At block 450, the processing device may notify the hypervisor of the address of the free memory page. Moving the substitute memory page from the hinting buffer to the free memory list, disassociating the free memory page from the free memory list, and notifying the hypervisor of the address of the free memory page may be performed by an atomic operation, as described in more detail herein above.

Figure 5:
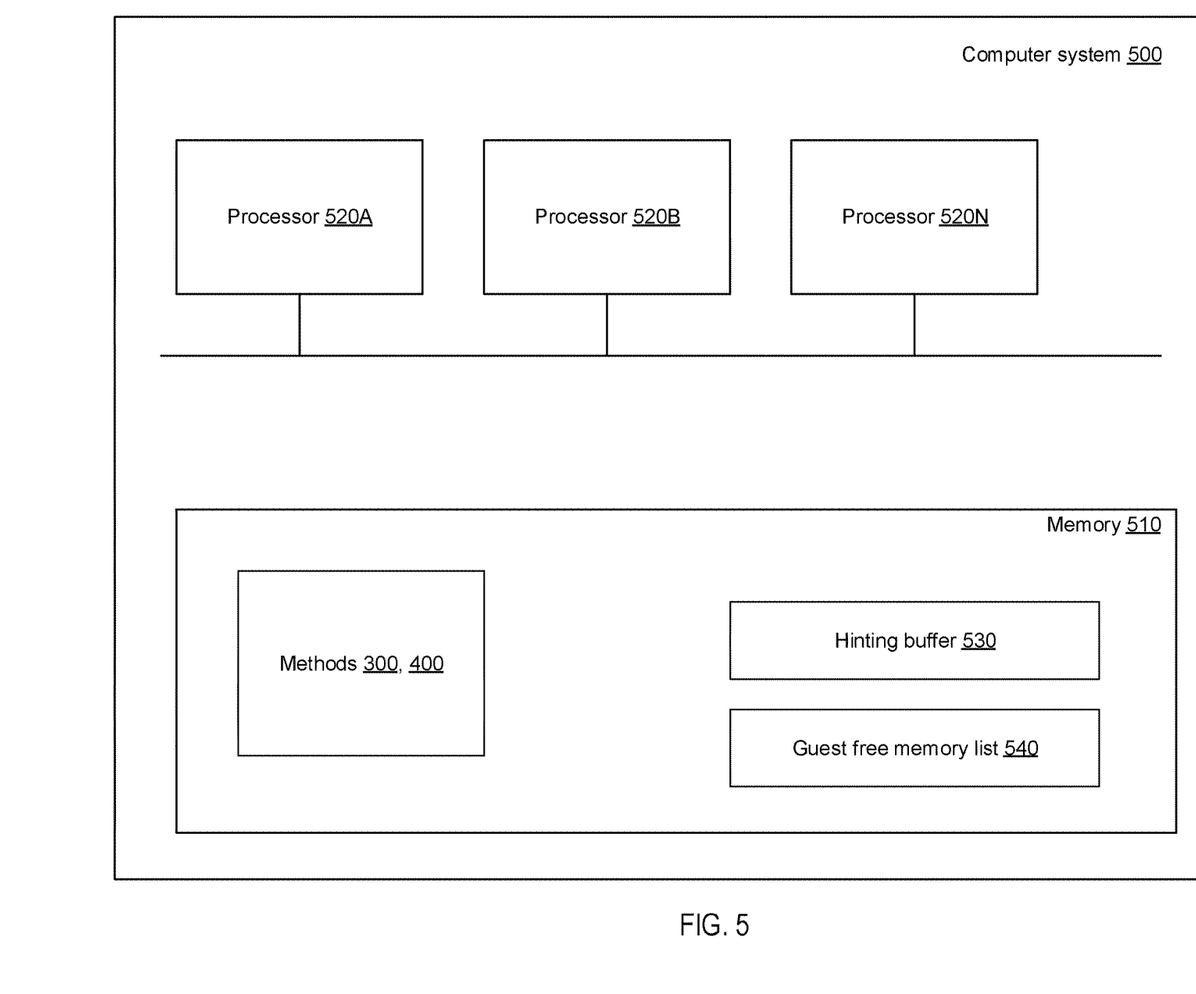
FIG. 5 depicts a component diagram of an example computer system operating in accordance with one or more aspects of the present disclosure.

FIG. 5 depicts a component diagram of an example computer system 500 operating in accordance with one or more aspects of the disclosure. In various implementations, computer system 500 may perform the functions of to the host computer system 100 of FIG. 1. Computer system 500 comprises a memory 510 and one or more physical processors 520A-520N, that are operatively coupled to the memory 510 and run a virtual machine executing one or more applications under control of a guest OS, which includes a balloon driver implementing the methods 300 and/or 400 for free memory hinting. The memory 510 may further store a hinting buffer 530 and a guest free memory list 540.

In operation, the balloon driver may identify, in hinting buffer 530, a substitute memory page and move the identified substitute memory page to free memory list 540. The balloon driver may then remove the reference to the identified free memory page from free memory list 540 and notify the host of the address of the free memory page, as described in more detail herein above.

Figure 6:
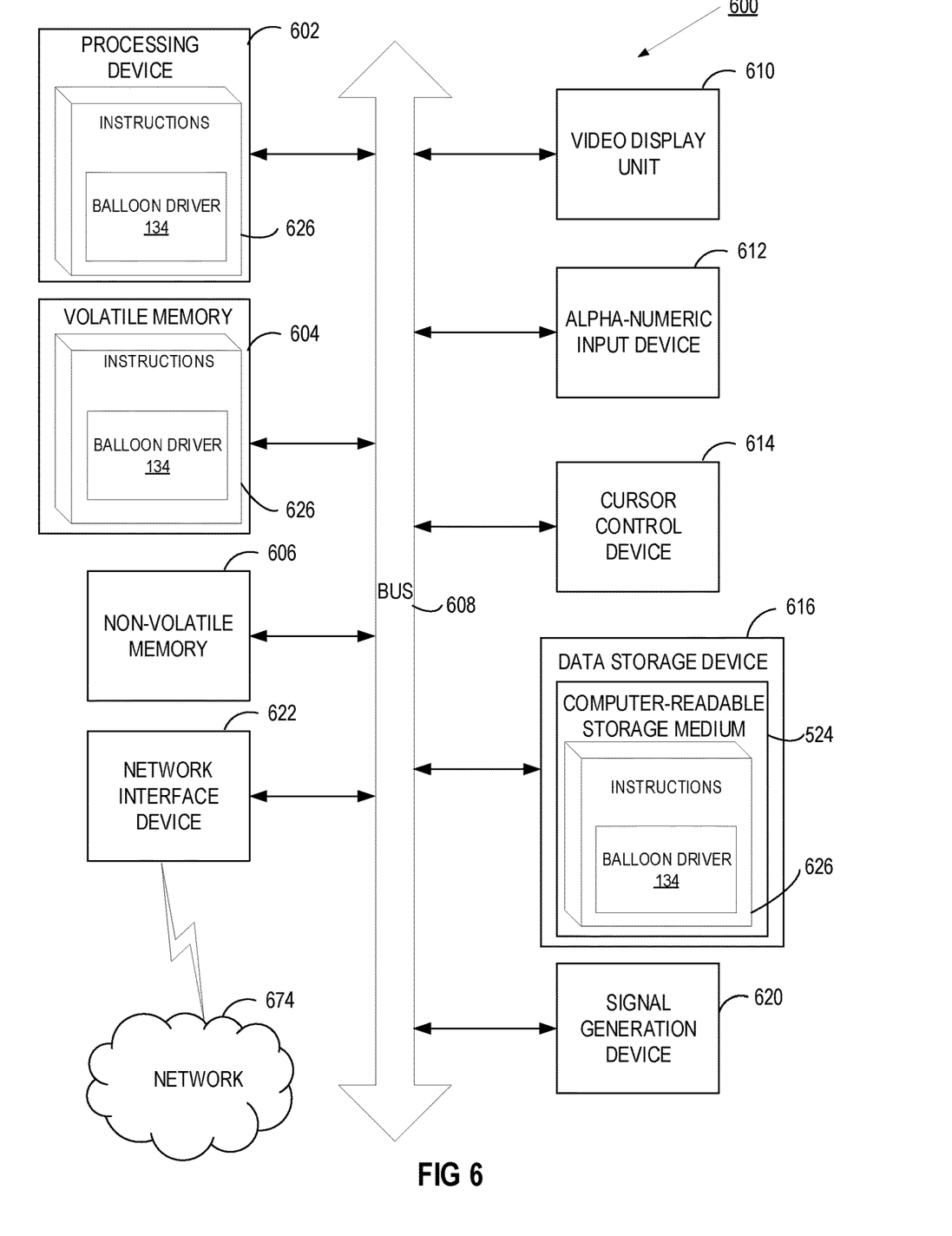
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to host computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 and/or 400 for free memory page hinting by a virtual machine.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying, by a virtual machine running on a host computer system, a first memory page referenced by a free memory list maintained by the virtual machine;
   identifying a second memory page residing in a hinting buffer associated with the virtual machine;
   performing an atomic operation to move the second memory page to the free memory list and disassociate the first memory page from the free memory list; and
   notifying the host computer system of an identifier of the first memory page.

2. The method of claim 1, wherein notifying the host computer system of the identifier of the first memory page causes the host computer system to reuse, without copying the first memory page to a persistent storage, a physical memory page that is allocated to the first memory page.

3. The method of claim 1, further comprising:
   responsive to receiving a completion notification from the host computer system, moving the first memory page to the hinting buffer.

4. The method of claim 1, further comprising:
   responsive to receiving a notification from the host computer system, moving the second memory page to the hinting buffer.

5. The method of claim 1, further comprising:
   allocating, by a balloon memory driver of the virtual machine, a plurality of memory pages to the hinting buffer.

6. The method of claim 1, wherein moving the second memory page to the free memory list is performed responsive to evaluating a memory pressure metric.

7. A system comprising:
a memory; and
a processing device operatively coupled to the memory, the processing device to:
identify a first memory page referenced by a free memory list maintained by a virtual machine;
identify a second memory page residing in a hinting buffer associated with the virtual machine;
perform an atomic operation to move the second memory page to the free memory list and disassociate the first memory page from the free memory list; and
notify a hypervisor of an identifier of the first memory page.

8. The system of claim 7, wherein notifying the hypervisor of the identifier of the first memory page causes the hypervisor to reuse, without copying the first memory page to a persistent storage, a physical memory page that is allocated to the first memory page.

9. The system of claim 7, wherein the processing device is further to:
responsive to receiving a completion notification from the hypervisor, move the first memory page to the hinting buffer.

10. The system of claim 7, wherein the processing device is further to:
responsive to receiving a notification from the hypervisor, move the second memory page to the hinting buffer.

11. The system of claim 7, wherein the processing device is further to:
allocate, by a balloon memory driver of the virtual machine, a plurality of memory pages to the hinting buffer.

12. The system of claim 7, wherein moving the second memory page to the free memory list is performed responsive to evaluating a memory pressure metric.

13. A non-transitory machine-readable storage medium storing executable instructions that, when executed by a processing device, cause the processing device to:
identify, by a virtual machine, a first memory page referenced by a free memory list maintained by the virtual machine;
identifying a second memory page residing in a hinting buffer associated with the virtual machine;
perform an atomic operation to move the second memory page to the free memory list and disassociate the first memory page from the free memory list; and
notifying a hypervisor of an identifier of the first memory page.

14. The non-transitory machine-readable storage medium of claim 13, wherein notifying the hypervisor of the identifier of the first memory page causes the hypervisor to reuse, without copying the first memory page to a persistent storage, a physical memory page that is allocated to the first memory page.

15. The non-transitory machine-readable storage medium of claim 13, further comprising executable instructions that, when executed by the processing device, cause the processing device to:
responsive to receiving a completion notification from the hypervisor, move the first memory page to the hinting buffer.

16. The non-transitory machine-readable storage medium of claim 13, further comprising executable instructions that, when executed by the processing device, cause the processing device to:
responsive to receiving a notification from the hypervisor, move the second memory page to the hinting buffer.

17. The non-transitory machine-readable storage medium of claim 13, further comprising executable instructions that, when executed by the processing device, cause the processing device to:
allocate, by a balloon memory driver of the virtual machine, a plurality of memory pages to the hinting buffer.

18. The non-transitory machine-readable storage medium of claim 13, wherein moving the second memory page to the free memory list is performed responsive to evaluating a memory pressure metric.

* * * * *